(12) United States Patent
Matthews et al.

(10) Patent No.: US 11,118,274 B2
(45) Date of Patent: *Sep. 14, 2021

(54) IONIC POLYMER MEMBRANE FOR A CARBON DIOXIDE ELECTROLYZER

(71) Applicant: 3M INNOVATIVE PROPERTIES COMPANY, St. Paul, MN (US)

(72) Inventors: Tyler S. Matthews, Apple Valley, MN (US); Steven J. Hamrock, Stillwater, MN (US); Marina M. Kaplun, Woodbury, MN (US); Krzysztof A. Lewinski, Mahtomedi, MN (US); Sean M. Luopa, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,038

(22) Filed: Jan. 13, 2020

(65) Prior Publication Data
US 2020/0149172 A1    May 14, 2020

Related U.S. Application Data

(63) Continuation of application No. 15/327,404, filed as application No. PCT/US2015/047198 on Aug. 27, 2015, now Pat. No. 10,570,524.

(Continued)

(51) Int. Cl.
*C25B 9/00*       (2021.01)
*C25B 13/08*      (2006.01)
(Continued)

(52) U.S. Cl.
CPC .............. *C25B 13/08* (2013.01); *B01J 41/13* (2017.01); *C08J 5/2231* (2013.01); *C25B 1/00* (2013.01);
(Continued)

(58) Field of Classification Search
CPC .. B01D 61/445; B01D 53/326; B01D 69/141; B01D 61/44; C25B 1/46; C25B 3/00;
(Continued)

(56) References Cited

U.S. PATENT DOCUMENTS 5,221,455 A    6/1993  Hanada
8,748,330 B2   6/2014  Debe
(Continued)

FOREIGN PATENT DOCUMENTS

CN    102912374    2/2013
GB    1 493 164    11/1977
(Continued)

OTHER PUBLICATIONS

Carlisle, "Vinyl-Functionalized Poly(imidazolium)s: A Curable Polymer Platform for Cross-Linked Ionic Liquid Gel Synthesis", Chemistry of Materials, 2014, vol. 26, pp. 1294-1296.

(Continued)

*Primary Examiner* — Zulmariam Mendez
(74) *Attorney, Agent, or Firm* — Julie Lapos-Kuchaar

(57) ABSTRACT

Described herein is a process for the reduction of carbon dioxide comprising:
  providing an electrochemical device comprising an anode, a cathode, and a polymeric anion exchange membrane therebetween, wherein the polymeric anion exchange membrane comprises an anion exchange polymer, wherein the anion exchange polymer comprises at least one positively charged group selected from a guanidinium, a guanidinium derivative, an N-alkyl conjugated heterocyclic cation, or combinations thereof;
  introducing a composition comprising carbon dioxide to the cathode; and (Continued)

applying electrical energy to the electrochemical device to effect electrochemical reduction of the carbon dioxide.

20 Claims, 6 Drawing Sheets

Related U.S. Application Data

(60) Provisional application No. 62/047,108, filed on Sep. 8, 2014.

(51) Int. Cl.
- *C25B 13/02* (2006.01)
- *C25B 1/00* (2021.01)
- *C25B 3/25* (2021.01)
- *C25B 9/19* (2021.01)
- *B01J 41/13* (2017.01)
- *C08J 5/22* (2006.01)

(52) U.S. Cl.
CPC ............... *C25B 3/25* (2021.01); *C25B 9/19* (2021.01); *C25B 13/02* (2013.01); *C08J 2339/04* (2013.01)

(58) Field of Classification Search
CPC ........... C25B 9/08; C25B 9/206; C25B 11/04; C25B 1/10; C25B 9/10; C25B 9/203
See application file for complete search history.

(56) References Cited

U.S. PATENT DOCUMENTS

| | | |
|---|---|---|
| 2010/0323249 A1 | 12/2010 | Fujiwara |
| 2010/0330435 A1 | 12/2010 | Nemeth |
| 2011/0275008 A1 | 11/2011 | Kim |
| 2011/0315560 A1 | 12/2011 | Rabaey |
| 2012/0171583 A1 | 7/2012 | Bocarsly |
| 2012/0252091 A1 | 10/2012 | Rasmussen |
| 2012/0292196 A1 | 11/2012 | Albrecht |
| 2012/0308903 A1 | 12/2012 | Masel |
| 2013/0008800 A1 | 1/2013 | Lakkaraju |
| 2013/0118911 A1 | 5/2013 | Sivasankar |
| 2013/0122382 A1 | 5/2013 | Mizuhata |
| 2013/0157174 A1 | 6/2013 | Masel |
| 2014/0093799 A1 | 4/2014 | Masel |
| 2014/0151240 A1 | 6/2014 | Bedell |
| 2014/0326603 A1 | 11/2014 | Kamai |

FOREIGN PATENT DOCUMENTS

| | | |
|---|---|---|
| JP | 2012-055868 | 3/2012 |
| WO | WO 2013-184366 | 12/2013 |
| WO | WO 2014-047661 | 3/2014 |
| WO | WO 2016-039999 | 3/2016 |

OTHER PUBLICATIONS

Delacourt, "Design of an Electrochemical Cell Making Syngas ($CO+H_2$) from $CO_2$ and $H_2O$ Reduction at Room Temperature", Journal of the Electrochemical Society, 2008, vol. 155, No. 01, pp. B42-B49.

Guo, "Synthesis and characterization of novel anion exchange membranes based on imidazolium-type ionic liquid for alkaline fuel cells", Journal of Membrane Science, 2010, vol. 362, pp. 97-104.

Kumar, "Renewable and metal-free carbon nanofiber catalysts for carbon dioxide reduction", Nature Communications, 2013, pp. 1-8.

Li, "Novel anion exchange membranes based on polymerizable imidazolium salt for alkaline fuel cell applications", Journal of Materials Chemistry, 2011, vol. 21, pp. 11340-11346.

Wang, "Alkaline polymer electrolyte membranes for fuel cell applications", Chemical Society Reviews, 2013, vol. 42, pp. 5768-5787.

Zhou, "High-Permeance Room-Temperature Ionic-Liquid-Based Membranes for CO2/N2 Separation", Industrial & Engineering Chemistry Research, 2014, vol. 53, pp. 20064-20067.

International Search Report for PCT International Application No. PCT/US2015/047198, dated Oct. 26, 2015, 4 pages.

IONIC POLYMER MEMBRANE FOR A CARBON DIOXIDE ELECTROLYZER

CROSS REFERENCE TO RELATED APPLICATIONS

This application is a continuation of U.S. application Ser. No. 15/327,404, filed Jan. 19, 2017, now allowed, which is a national stage filing under 35 U.S.C. 371 of PCT/US2015/047198, filed Aug. 27, 2015, which claims the benefit of U.S. Application No. 62/047,108, filed Sep. 8, 2014, the disclosure of which is incorporated by reference in its/their entirety herein.

TECHNICAL FIELD

Polymeric ion exchange membranes for carbon dioxide electrochemical devices are disclosed.

BACKGROUND

Carbon dioxide ($CO_2$) is a greenhouse gas that plays the dominant role in global warming and climate change. Much research effort has been spent over the last few decades in finding ways to decrease emissions of $CO_2$ into the atmosphere, including carbon sequestration.

One of the proposed solutions is to capture $CO_2$ at high-emission point sources such as fossil fuel based power plants, steel mills, cement plants, etc., and store or "sequester" the $CO_2$ underground, in depleted oil and gas fields, unminable coal seams, and deep saline aquifers. However, there are many locations where either a lack of appropriate geological storage sites or public opposition to local underground storage of the highly compressed gas prevents this sequestration approach.

One alternative is to use the captured $CO_2$ as a low cost carbon feedstock for the production of high value chemicals. By converting the $CO_2$ into liquid or solid carbon-based compounds, the release of more $CO_2$ greenhouse gas into the environment can be prevented, or at least significantly delayed.

SUMMARY

Figure 1:
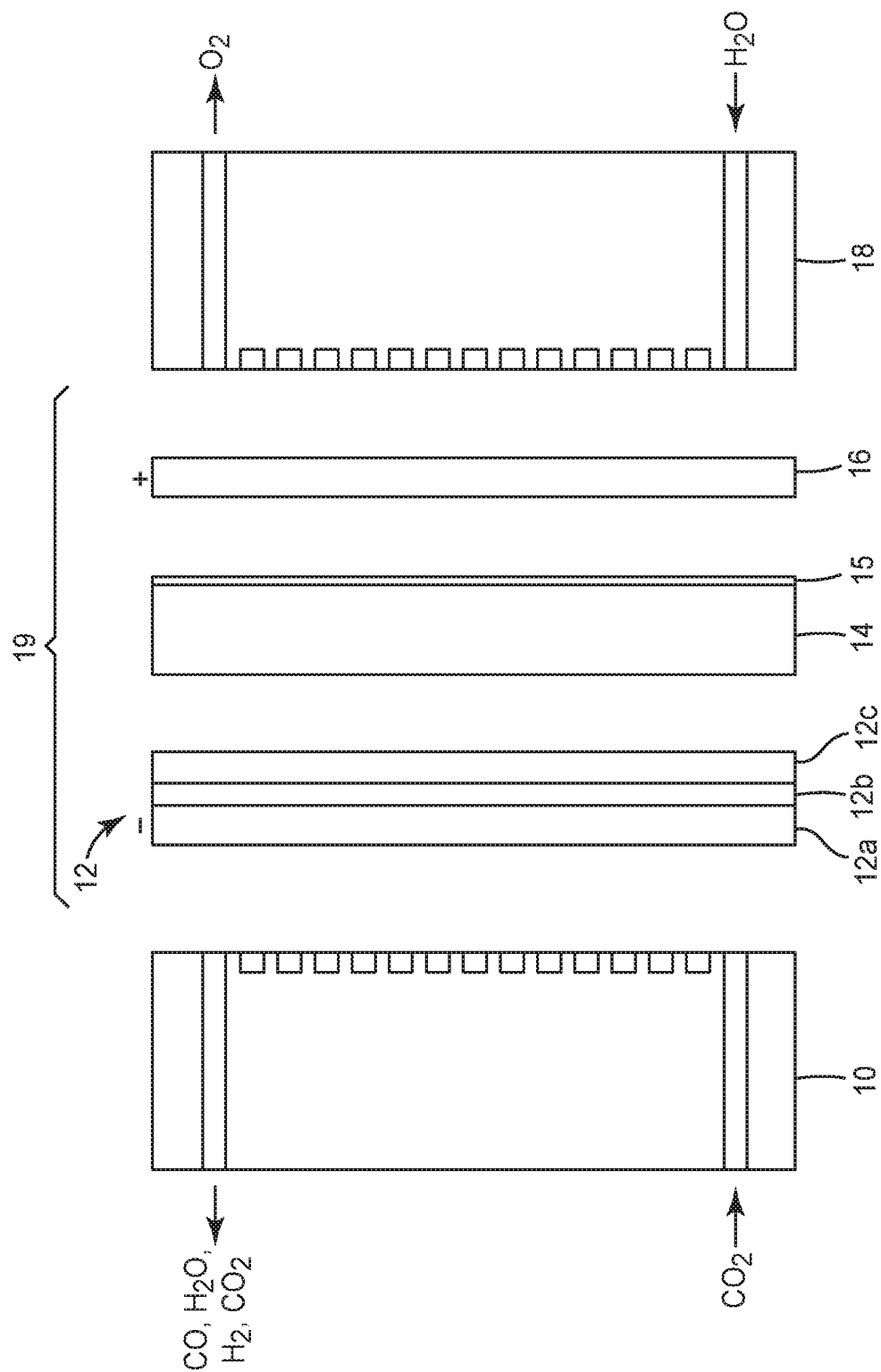
FIG. 1 is a cross-sectional schematic of the electrochemical cell of Example 1.

There is a desire to identify electrochemical devices for the electrochemical reduction of carbon dioxide that are less expensive, more compact, and/or more user friendly, namely by employing an electrolyte material which is a solid, specifically a polymeric ion exchange membrane. Advantageously, the polymeric ion exchange membrane provides a reduced overpotential and increased selectivity for electrochemically reducing $CO_2$ to CO.

In one aspect, a process for the electrochemical reduction of carbon dioxide is described comprising: (a) providing an electrochemical device comprising an anode, a cathode, and a polymeric anion exchange membrane therebetween, wherein the polymeric anion exchange membrane comprises an anion exchange polymer, wherein the anion exchange polymer comprises at least one positively charged group selected from a guanidinium, a guanidinium derivative, an N-alkyl conjugated heterocyclic cation, or combinations thereof; (b) introducing a composition comprising carbon dioxide to the cathode; and (c) applying electrical energy to the electrochemical device to effect electrochemical reduction of the carbon dioxide.

In another aspect, a system for electrochemically reducing carbon dioxide is described comprising (a) an electrochemical device comprising (i) an anode electrode, (ii) a cathode electrode, and (iii) a polymeric anion exchange membrane therebetween, wherein the polymeric anion exchange membrane comprises an anion exchange polymer, wherein the anion exchange polymer comprises at least one positively charged group selected from a guanidinium, a guanidinium derivative, an N-alkyl conjugated heterocyclic cation, or combinations thereof, and (iv) a cathode flow field adjacent to the cathode electrode opposing the polymeric anion exchange resin; and (b) a carbon dioxide input, wherein the carbon dioxide input is configured to provide a composition comprising carbon dioxide to the cathode flow field for reduction of the carbon dioxide at the cathode electrode.

In yet another aspect, an article for electrochemical reduction of carbon dioxide is described comprising: (a) a cathode; (b) a bipolar membrane comprising (i) a polymeric anion exchange membrane layer comprising a polymeric anion exchange resin and a polymeric cation exchange resin and (ii) a polymeric cation exchange membrane layer; and (c) an anode.

In still a further aspect, an article for electrochemical reduction of carbon dioxide comprises (a) a cathode; (b) a bipolar membrane comprising (i) a polymeric cation exchange membrane layer comprising a polymeric anion exchange resin and a polymeric cation exchange resin and (ii) a polymeric anion exchange membrane layer; and (c) an anode.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more;

"and/or" is used to indicate one or both stated cases may occur, for example A and/or B includes, (A and B) and (A or B);

"ion exchange membrane" is a membrane comprising ion containing polymers (also known as ion exchange resins,) in which the ion containing polymers are typically almost exclusively either polycations or polyanions. The counterions of the polymers' charged functional groups are typically small, water soluble ions, which can migrate through the membrane polymer matrix, particularly under the influence of an electric field or a concentration gradient;

"polymer" refers to a macrostructure having a number average molecular weight (Mn) of at least 10,000 dalton, at least 25,000 dalton, at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer; and "polymer backbone" refers to the main continuous chain of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The electrochemical device for the electrochemical reduction of carbon dioxide comprises a membrane electrode assembly which comprises a cathode, an anode, and an electrolyte material therebetween. In a carbon dioxide electrolyzer, the cathode is the electrode with the more negative potential. The electrolyte material acts as an electrical insulator, separating the anode from the cathode, and it also acts as an ion conductor, allowing ions to pass between the electrodes to sustain the electrochemical reaction. A flow field layer is typically placed on each side of the membrane electrode assembly. The flow field layer is used to deliver reactants to and/or remove products from device. The reduction generally takes place by introducing carbon dioxide into a cathode flow field (i.e., flow field located on the cathode side of the electrochemical device) and introducing a reactant (e.g., water or hydrogen gas) into an anode flow field. In the case of water, with electrical energy, the water at the anode is oxidized generating ions (e.g., $H^+$ or $OH^-$), which then pass through the electrolyte material and then participate in the reduction of the carbon dioxide at the cathode, forming, for example, carbon monoxide (CO), hydrogen ($H_2$), and water.

Traditionally, the electrolyte material used in an electrochemical device for the reduction of carbon dioxide involves a liquid electrolyte material, such as a water electrolyte solution containing electrolyte salts (e.g., 2 molar potassium chloride,) acids, or bases. Sometimes, a separator membrane is used in addition to a liquid electrolyte material to separate the electrochemical cell into a cathode portion and an anode portion, in order to reduce crossover of reaction products to the opposite electrode, thus improving the cell's electrical conversion efficiency. A typical separator membrane may comprise a sulfonated tetrafluoroethylene-based fluoropolymer such as that sold under the trade designation "NAFION" by E.I. du Pont de Nemours and Co., Wilmington, Del.

The present disclosure is directed toward an electrochemical device for the reduction of carbon dioxide using a polymeric anion exchange membrane. The use of a polymeric ion exchange resin (as opposed to a liquid electrolyte) minimizes liquid handling, pumps, and plumbing, often reducing the device's size and capital cost. Furthermore, more compact electrochemical devices can be made by using the ion exchange membranes of the present disclosure since in traditional liquid electrolyte-based electrochemical cells, sufficient space needs to be maintained between the anode and cathode for bubbles of product gas to escape, and to avoid crossover of the product gases to the opposite electrode, which would cause the products to revert back to reactant materials, releasing energy as heat and reducing the conversion efficiency of the device.

In the fuel cell art, wherein hydrogen and oxygen are converted into water, producing electricity and heat, polymeric cation exchange membranes have been used to separate the anode and the cathode while allowing for the transport of ions. Such membranes include polymers or copolymers of perfluorosulfonic acids (PFSA). For example, PFSA materials sold under the trade designation "NAFION" by E.I. du Pont de Nemours and Co., Wilmington, Del. However, it is known that other cations can exchange with the protons of the PFSA's sulfonic acid groups ($-SO_3^-H^+$) within and/or on the surface of membrane, thus decreasing the ionic conductivity of the membrane and increasing its electrical resistance.

U.S. Pat. Publ. No. 2014/0093799 (Masel et al.) discloses a catalyst mixture comprising at least one Catalytically Active Element and at least one Helper Catalyst. When the Catalytically Active Element and the Helper Catalyst are used together, the rate and/or selectivity of a chemical reaction for the electrochemical conversion of carbon dioxide can be enhanced over the rate seen in the absence of the Helper Catalyst. However, the Helper Catalysts for $CO_2$ reduction comprise a cationic group. Adding a cation such as one of Masel et al.'s Helper Catalysts to an electrochemical device having a polymeric cation exchange membrane could be expected to increase cell membrane resistance and decrease cell efficiency over time. For example, Helper Catalyst cations could exchange for the protons in the membrane, blocking proton transfer, reducing proton conductivity, and increasing electrical resistance, as described above. Thus, it would be advantageous to provide a polymeric ion exchange membrane for use in an electrochemical device that can tolerate the presence of large amounts of non-proton cations.

In the present disclosure, it has been discovered that by employing a polymeric anion exchange membrane comprising particular cationic groups in an electrochemical cell, sufficient reduction of carbon dioxide into carbon monoxide can be achieved. The present disclosure is directed toward the electrochemical conversion of carbon dioxide (or its hydrated forms) via an oxidation-reduction (redox) reaction to form reduced forms (or lower oxidation state forms).

The polymeric ion exchange membrane of the present disclosure is a solid, meaning that it does not readily flow when poured, e.g., it has a viscosity at ambient conditions of greater than $10^{10}$, $10^{11}$, $10^{12}$, or even $10^{13}$ Pascal seconds. In one embodiment, of the electrochemical cell of the present disclosure is substantially free (i.e., less than 1%, 0.5% or even 0.1% by weight of the ion exchange membrane) of a liquid electrolyte between the two electrodes, wherein the liquid electrolyte has a viscosity less than $10^{10}$, $10^{11}$, or even $10^{12}$ Pascal seconds.

In one embodiment, the polymeric ion exchange membrane is dense, meaning it forms a continuous, nonporous film or layer.

In another embodiment, the polymeric ion exchange resin is porous, meaning the membrane contains open passages passing from one major surface of the membrane to the opposite major surface and these passages are at least large enough to allow some solvated ions to pass through. Examples include membranes classified as ultrafiltration membranes, nanofiltration membranes, microfiltration membranes, etc. These membranes typically have a nominal pore diameter of at least 0.02 micrometers.

The polymeric anion exchange membrane of the present disclosure comprises an ion exchange polymer, which comprises positively charged groups selected from guanidinium, a guanidinium derivative, an N-alkyl conjugated heterocyclic cation, or combinations thereof.

The positively charged groups may be present as pendant groups off of the polymer backbone or may be part of the polymer backbone. The anion exchange polymer comprises at least one positively charged group, but more typically comprises an equivalent weight (grams of polymer per mole of ionic group) of 1500 or less, 1200 or less, 1100 or less, 1050 or less, 1000 or less, or even 800 or less. The polymer is not particularly limited. Suitable polymer backbones may comprise polymers or co-polymers of vinyl groups, styrene groups, perfluoroethylene groups, acrylate groups, ethylene groups, propylene groups, epoxy groups, urethane groups, ester groups, and other groups known to those skilled in the art.

The positively charged group may be a guanidinium or a guanidinium analog such as a thiouronium or an uronium. Exemplary groups include: the thiouronium radical, $—S=C(NH_2)_2^+$, or substituted thiouronium radicals, such as, $—S=C(N(CH_3)_2)_2^+$.

The positively charged group may be an N-alkyl conjugated heterocyclic cation. Such groups include N,N'-disubstituted imidazoliums, 1,2,3-trisubstituted imidazoliums, N-substituted pyridiniums, N-substituted isoquinoliniums, and N-disubstituted pyrrolidiniums. Exemplary groups include: 1-R1-3-R2-imidazolium, wherein R1 may comprise alkyl diradicals of the form $—(CH_2)_m—$, wherein m=0-8 and R2 is an alkyl radical of the form $—(CH_2)_nCH_3$, wherein n=0-8. The alkyl groups may be linear, branched, or cyclic, and may optionally contain heteroatoms and/or aromatic structures.

The anion exchange membranes may be made using techniques known in the art, for example, by casting a liquid composition comprising the anion exchange polymer, and drying and optionally annealing to form a membrane; or by extrusion of the molten polymer. In one embodiment, the anion exchange membrane may comprise a porous support which is imbibed with a liquid composition comprising the anion exchange polymer, followed by removal of the solvent to embed the polymer into the pores of the mechanical support. Optionally the polymer can be cross-linked in the pores of the mechanical support. Optionally, the porous support can be imbibed with a monomer which is then polymerized and/or cross-linked to embed the polymer into the pores of the mechanical support. Typically the porous support is electrically non-conductive. Typically, the porous support comprises a fluoropolymer, which is more typically perfluorinated, such as expanded PTFE (polytetrafluoroethylene). Other exemplary porous supports include fiberglass, polymer fibers, fiber mats, perforated films, and porous ceramics.

In one embodiment, in addition to the anion exchange polymer comprising at least one positively charged group, the ion exchange membrane further comprises a cation exchange polymer comprising at least one negatively charged group. This cation exchange polymer can be blended with the anion exchange polymer to form the ion exchange membrane or can be a layer adjacent to a layer comprising the anion exchange polymer to form a bipolar membrane.

In one embodiment, the bipolar membrane comprises two distinct layers, a first layer comprising an anion exchange polymer and a second layer comprising a cation exchange polymer. In another embodiment, the bipolar membrane has a thickness direction, and the composition of the bipolar membrane varies along its thickness direction in a gradient from predominantly a cation exchange polymer to predominantly an anion exchange polymer. With the bipolar membrane, the layer comprising the anion exchange polymer, or the predominant anion exchange polymer, faces the cathode in the electrochemical cell.

The cation exchange polymer is a polymer selected from a sulfonic acid containing polymer, a sulfonyl imide containing polymer, a carboxylic acid containing polymer, a phosphonic acid containing polymer, a trisulfonyl methide acid containing polymer, or combinations thereof. In one embodiment, the cation exchange polymer is partially fluorinated or fully fluorinated.

The polymeric anion exchange membrane of the present disclosure has a thickness of less than 90 micrometers, 60 micrometers, or even 30 micrometers, and greater than 100 nanometers. In one embodiment, the distance between the anode and the cathode is less than 90 micrometers, 60 micrometers, or even 30 micrometers, and greater than 100 nanometers.

The polymeric anion exchange membrane of the present disclosure is placed between two electrodes, the anode and cathode, which comprise a metal. In some embodiments, the electrode is a gas diffusion electrode comprising a gas diffusion layer coated with a catalyst. Gas diffusion layers are known in the art and include for example carbon paper or cloth, or a metal mesh.

Electrode materials can include, for example, graphitic carbon, glassy carbon, titanium, or any of the following "catalytically active elements": V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, Nd, and alloys or combinations thereof.

In one embodiment, the electrochemical device comprises catalytically active nanoparticles. The nanoparticles may be supported on carbon particles or nanostructured supports, such as carbon nanotubes or nanostructured thin films (NSTF) as disclosed in U.S. Pat. No. 8,748,330 (Debe, et al.).

In one embodiment, the electrochemical device comprises an extended surface area catalyst based electrode such as a nanostructured thin film electrode, nanotube electrode, porous sponge electrode, or two dimensional polycrystalline film electrode.

In one embodiment, the cathode of the electrochemical device comprises a metal selected from silver, gold, copper, or combinations thereof.

In one embodiment, the anode of the electrochemical device comprises a metal selected from ruthenium, iridium, platinum, titanium, or combinations thereof. In one embodiment, the electrochemical device is substantially free of platinum, meaning the electrode comprises less than 0.1%, 0.01% or even 0.001% by weight of platinum.

The cathode, the anode, and/or the polymeric anion exchange membrane can be assembled each as separate components or can be fabricated wherein the polymeric anion exchange membrane (or a portion thereof) is fabricated with one or both electrodes or a portion thereof. For example, to maximize cost savings and in some instances performance, the individual components, or layers thereof, may be sufficiently thin, such that some of the components could act as a support during the fabrication of a thin layer. The various components or portions thereof can be laminated together, formed in situ on a surface of a component, and/or coated onto a component.

The membrane electrode assembly comprising the anode, cathode and polymeric ion exchange resin is sandwiched between two flow field plates and then held together such that each layer is in contact, preferably intimate contact with the adjacent layers.

As used herein the carbon dioxide input is a composition comprising, in one embodiment carbon dioxide in its pure form. In another embodiment, the composition comprising carbon dioxide comprises carbon dioxide, and $HCO_3^-$ and/or $CO_3^{2-}$. In one embodiment, the composition comprising the carbon dioxide may be humidified, comprising at most 100% relative humidity and at least 1% relative humidity. Generally, the presence of water with the carbon dioxide input will generate hydrated forms of carbon dioxide including carbonate and bicarbonate. Alternatively, in one embodiment, the composition comprising the carbon dioxide may not be humidified.

A potential is applied across the electrochemical cell to electrochemically reduce the composition comprising the carbon dioxide. For the reduction of carbon dioxide, the cathode is operated at a potential equal to or more negative than $-0.2$ V with respect to a standard hydrogen electrode, for example, more negative than $-0.2$, $-0.5$, $-1.0$, $-1.5$, $-2.0$, $-2.5$, or even $-3.0$V.

Ideally, the potential applied across the electrochemical cell is generated from a carbon-neutral energy source, which is a source of energy, particularly electrical energy, from which there is essentially no net release of $CO_2$ or other greenhouse gases to the environment as a result of the normal operation of the energy-gathering device or process. Examples include solar, wind, tidal, wave, geothermal, or nuclear.

The reaction products generated by the electrochemical reduction of the carbon dioxide, in addition to CO, hydrogen ($H_2$), and water, may include other reduced products, such as $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$ or $(COO^-)_2$. By varying the reactants and/or reaction parameters, such as the catalyst material, the anionic membrane material, solvent (if any,) and reduction potential, the reaction products observed and their ratios can be adjusted. For example, in one embodiment, the rate of generating reaction products can be adjusted based on the availability of electrical energy from a carbon-neutral energy source. In one embodiment, a syngas may be generated. A syngas is a mixture comprising carbon monoxide (CO) and hydrogen ($H_2$) and sometimes carbon dioxide, which can be used as a feedstock for synthesizing more complex carbon-based materials. Carbon monoxide selectivity of a reaction can be quantified by measuring the amount of carbon monoxide present in the reaction product versus the total amount of reaction products (e.g., hydrogen gas and carbon monoxide). In one embodiment, the electrochemical device of the present disclosure has a carbon monoxide selectivity of greater than 1, 2, 3, 4, 5, 10, 25, 30, 40 or even 50% and no more than 100%.

In one embodiment, the process of the present disclosure can further include the step of adjusting the rate of generating reaction products according to the availability of electrical energy from the carbon-neutral energy source. This process can be used for long-term storage of carbon-neutral renewable energy, particularly intermittent renewable energy such as wind and solar, by converting low-cost "waste $CO_2$" into higher energy, higher value chemicals and fuels. By starting and stopping individual electrolyzer cells in a bank of cells, or otherwise adjusting the overall production rate of reaction products, as the amount of available carbon-neutral renewable energy fluctuates, an electrolyzer bank connected to an electrical grid can help balance the electrical load and stabilize the grid, thus permitting a greater degree of integration of intermittent renewable energy sources into the electrical grid. This "demand control" method of operation of a bank of electrolyzer cells can provide various "ancillary services" to the electrical grid, such as frequency control, peak shaving, etc. This approach has the further benefits that it not only reduces global warming and ocean acidification due to $CO_2$ greenhouse gas emissions, but it also reduces the amount of new fossil fuel that must be extracted, transported, refined, and imported. Local production of fuels (e.g., based on $CO_2$ from biomass gasification or fermentation processes) can provide increased energy independence for regions that have limited fossil fuel resources, such as islands.

In one embodiment, the electrochemical device for reduction of carbon dioxide comprises a membrane electrode assembly comprising: (a) a cathode; (b) a bipolar membrane comprising (i) a polymeric anion exchange membrane layer comprising a polymeric anion exchange resin and a polymeric cation exchange resin and (ii) a polymeric cation exchange membrane layer; and (c) an anode, wherein the bipolar membrane is not limited to the polymeric ion membranes disclosed herein. The polymeric anion exchange membrane has overall anionic exchange character, in other words, the membrane may also have cation exchange sites as well as anion exchange sites, but the membrane has more anion exchange sites.

In one embodiment the electrochemical device for reduction of carbon dioxide comprises a membrane electrode assembly comprising: (a) a cathode; (b) a bipolar membrane comprising (i) a polymeric cation exchange membrane layer comprising a polymeric anion exchange resin and a polymeric cation exchange resin and (ii) a polymeric anion exchange membrane layer; and (c) an anode, wherein the bipolar membrane is not limited to the polymeric ion membranes disclosed herein. The polymeric cation exchange membrane has overall cationic exchange character, in other words, the membrane may also have anion exchange sites as well as cation exchange sites, but the membrane has more cation exchange sites.

Illustrative embodiments of the present disclosure are as follows:

Embodiment 1

A process for the electrochemical reduction of carbon dioxide comprising: providing an electrochemical device comprising an anode, a cathode, and a polymeric anion exchange membrane therebetween, wherein the polymeric anion exchange membrane comprises an anion exchange polymer, wherein the anion exchange polymer comprises at least one positively charged group selected from a guanidinium, a guanidinium derivative, an N-alkyl conjugated heterocyclic cation, or combinations thereof;
introducing a composition comprising carbon dioxide to the cathode; and
applying electrical energy to the electrochemical device to effect electrochemical reduction of the carbon dioxide.

Embodiment 2

The process of claim 1, wherein the guanidinium derivative is selected from a thiouronium, an uronium, or combinations thereof.

Embodiment 3

The process of embodiment 1, wherein the N-alkyl conjugated heterocyclic cation is selected from N,N'-disubstituted imidazoliums, 1,2,3-trisubstituted imidazoliums, N-substituted pyridiniums, N-substituted isoquinoliniums, N-disubstituted pyrrolidiniums, or combinations thereof.

Embodiment 4

The process of any one of the previous embodiments, wherein the electrochemical cell is substantially free of a liquid electrolyte.

Embodiment 5

The process of any one of the previous embodiments, wherein the at least one positively charged group is a pendant moiety of the anion exchange polymer.

Embodiment 6

The process of any one of the previous embodiments, wherein the at least one positively charged group is part of the backbone of the anion exchange polymer.

Embodiment 7

The process of any one of the previous embodiments, wherein the polymeric anion exchange membrane comprises a blend of the anion exchange polymer and a cation exchange polymer.

Embodiment 8

The process of any one of the previous embodiments, wherein the polymeric anion exchange membrane is a bipolar membrane, comprising a cation exchange polymer layer adjacent to an anion exchange polymer layer.

Embodiment 9

The process of embodiment 8, wherein the cation exchange polymer layer and the anion exchange polymer layer are two distinct layers.

Embodiment 10

The process of embodiment 8, wherein the bipolar membrane has a thickness direction, and the composition of the bipolar membrane varies along its thickness direction in a gradient from predominantly a cation exchange polymer to predominantly an anion exchange polymer.

Embodiment 11

The process of any one of embodiments 7-10, wherein the cation exchange polymer is selected from a sulfonic acid containing polymer, a sulfonyl imide containing polymer, a carboxylic acid containing polymer, a phosphonic acid containing polymer, a trisulfonyl methide acid containing polymer, or combinations thereof.

Embodiment 12

The process of embodiment 11, wherein the cation exchange polymer is fluorinated.

Embodiment 13

The process of any one of the previous embodiments, wherein the cathode comprises a metal selected from silver, gold, copper, or combinations thereof.

Embodiment 14

The process of any one of the previous embodiments, wherein the cathode is operated at a potential equal to or more negative than −0.2 V with respect to a standard hydrogen electrode.

Embodiment 15

The process of any one of the previous embodiments, wherein the anode comprises a metal selected from ruthenium, iridium, platinum, titanium, or combinations thereof.

Embodiment 16

The process of any one of the previous embodiments, wherein the electrochemical device further comprises flow fields.

Embodiment 17

The process of any one of the previous embodiments, wherein the polymeric anion exchange membrane comprises a porous support imbibed with the anion exchange polymer.

Embodiment 18

The process of embodiment 17, wherein the porous support comprises at least one of fiberglass, polymer fibers, fiber mats, perforated films, porous ceramics, and expanded PTFE.

Embodiment 19

The process of any one of the previous embodiments, wherein the polymeric anion exchange membrane is dense.

Embodiment 20

The process of any one of embodiments 1-18, wherein the polymeric anion exchange membrane is porous.

Embodiment 21

The process of any one of the previous embodiments, wherein the process has a carbon monoxide selectivity of greater than 2%.

Embodiment 22

The process of any one of the previous embodiments, wherein the electrochemical device comprises catalytically active nanoparticles.

Embodiment 23

The process of any one of the previous embodiments, wherein the electrochemical device comprises a catalytically active extended surface area catalyst-based electrode such as a nanostructured thin film electrode, a coated nanotube electrode, a porous sponge electrode, or a two dimensional polycrystalline film electrode.

Embodiment 24

A system for reducing carbon dioxide comprising:
(a) an electrochemical device comprising (i) an anode electrode, (ii) a cathode electrode, and (iii) a polymeric anion exchange membrane therebetween, wherein the polymeric anion exchange membrane comprises an anion exchange polymer, wherein the anion exchange polymer comprises at least one positively charged group selected from a guanidinium, a guanidinium derivative, an N-alkyl conjugated heterocyclic cation, or combinations thereof, and (iv) a cathode flow field adjacent to the cathode electrode opposing the polymeric anion exchange resin; and
(b) a carbon dioxide input, wherein the carbon dioxide input is configured to provide a composition comprising carbon dioxide to the cathode flow field for reduction of the carbon dioxide at the cathode electrode.

Embodiment 25

The system of embodiment 24, further comprising an anode gas diffusion layer.

Embodiment 26

The system of any one of embodiments 24-25, further comprising a cathode gas diffusion layer.

Embodiment 27

The system of any one of embodiments 24-26, further comprising an anode flow field.

Embodiment 28

The system of any one of embodiments 24-27, further comprising a cathode flow field.

Embodiment 29

The system of any one of embodiments 24-28, further comprising a depolarizer source coupled to the anode electrode, wherein the depolarizer source is configured to supply a depolarizer to the anode electrode.

Embodiment 30

An article for electrochemical reduction of carbon dioxide comprising:
a cathode;
a bipolar membrane comprising (i) a polymeric anion exchange membrane layer comprising a polymeric anion exchange resin and a polymeric cation exchange resin and (ii) a polymeric cation exchange membrane layer; and
an anode.

Embodiment 31

An article for reduction of carbon dioxide comprising
a cathode;
a bipolar membrane comprising (i) a polymeric cation exchange membrane layer comprising a polymeric anion exchange resin and a polymeric cation exchange resin and (ii) a polymeric anion exchange membrane layer; and
an anode.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or Alfa Aesar; Ward Hill, Mass. or known to those skilled in the art unless otherwise stated or apparent.

These abbreviations are used in the following examples: cm=centimeter, min=minutes, hr=hour, mA=milliamp, mol=mole, mg=milligram, mm=millimeter, µm=micrometer, µM=micromolar, V=volt, and wt=weight.

Preparation of 1,3-ethylvinylimidazolium bromide monomer (EVIM-Br)

Stoichiometric amounts of 1-vinylimidazole and ethyl bromide mixed in a round bottom flask with acetonitrile (solvent) in a 10:1 volume ratio of solvent:reagents. The flask was heated at 35° C. using an oil bath. The solution was kept under a nitrogen blanket with constant stirring throughout the reaction. After 24 hr of reaction time, the product was precipitated using diethyl ether. The solid precipitate was separated from the solvent and dried in a vacuum oven for 24 hr to obtain pale brown crystals.

Preparation of 1,3-divinyl imidazolium bromide

Stoichiometric amounts of 1-vinylimidazole and 3-bromopropene were mixed in a round bottom flask with acetonitrile (solvent) in a 10:1 volume ratio of solvent:reagents. The flask was connected to a reflux condenser and the mixture was heated using a hot oil bath to 70° C. for 24 hr. The solution was kept under a nitrogen gas blanket and stirred constantly throughout the reaction. The resulting product was precipitated in diethyl ether and a dark reddish-orange viscous liquid was obtained after centrifugation and decantation of the solvent.

Cathode Membrane Assembly A

A cathode membrane assembly was fabricated starting with a carbon paper gas diffusion layer (product name MB-30 from Ballard Power Systems Inc. of Burnaby, BC, Canada). A 1.75 µm thick layer of silver was deposited onto the surface of the carbon paper using electron beam evaporation to create an Ag-coated carbon paper.

0.03 mole of EVIM-Br was mixed with 5 mol % (1.5 µM) perfluorosulfonic acid (PFSA) (PFSA ionomer dispersion, 825 equivalent weight available from 3M Co., St. Paul, Minn.) and 10 mol % (3 µM) divinylbenzene (crosslinker), using an 80:20 methanol:water solution as the solvent. Photoinitiator (available under the trade designation "IRGA-CUR 2959" from BASF, Ludwigshafen, Germany), 2% by mass of EVIM-Br, was added and the resulting slurry was transferred to a glass vial, deaerated for 10 minutes using a nitrogen stream, and then sealed to prevent oxygen dissolution. The clear glass vial was irradiated using a UV lamp with a wavelength of 2537 Å (model number RPR-100 from Rayonet Photochemical Reactors, Branford, Conn.) for 30 minutes. The as-synthesized polyelectrolyte slurry then was cast onto the surface of the Ag-coated carbon paper (from above) to a thickness of 30 mil (0.76 mm). The casted paper was then dried in an oven (rated for use with solvents) at 60° C. for 24 hr to form Cathode Membrane Assembly A which comprises the following layers: carbon paper/silver/membrane comprising the polymerized EVIM-Br and PFSA.

Cathode Membrane Assembly B

A cathode membrane assembly was fabricated starting with a carbon paper gas diffusion layer (product name H2315 from Freudenberg FCCT SE & Co. KG, Weinheim, Germany). Silver was deposited onto the surface of the carbon paper to a specific loading of 14 mg/cm$^2$ using electron beam evaporation. Cathode Membrane Assembly B comprises the following layers: carbon paper/silver.

Cathode Membrane Assembly C

A cathode membrane assembly was fabricated starting with a carbon paper gas diffusion layer (product name MB-30 from Ballard Power Systems Inc. of Burnaby, BC, Canada). A 1.75 μm thick layer of silver was deposited onto the surface of the carbon paper using electron beam evaporation. Cathode Membrane Assembly C comprises the following layers: carbon paper/silver Example 1

The following components with reference to FIG. 1 were used in the electrochemical cell:

Flow Field: a block of graphite (Poco Graphite, Inc., Decatur, Tex.) with a machined serpentine flow pattern to deliver fluid/gas, along with the requisite plumbing hardware to connect to external tubing, where 10 is the cathode flow field.

Cathode: Cathode Membrane Assembly A 12 comprising carbon paper 12a, silver layer 12b, and membrane comprising the polymerized EVIM-Br and PFSA 12c.

Anode: The anode membrane assembly was prepared as follows: A microstructured catalyst transfer substrate was formed on a backing. The microstructured catalyst transfer substrate was coated with perylene red followed by annealing at 270° C. in a vacuum oven to form a nanostructured thin film (NSTF). Iridium metal was deposited on the surface of the resulting NSTF by DC magnetron sputtering of an iridium target. The total iridium loading was 0.25 mg/cm$^2$. The iridium-coated NSTF layer was then directly laminated onto a 24 μm thick PFSA membrane (825 equivalent weight, available from 3M Co.) using a roll laminator (ChemInstruments International Co., Fairfield, Ohio) at a temperature of 350° F., pressure of 150 pounds per square inch, and 1.2 feet per minute and the backing was removed. The assembly comprised the following layers: PFSA layer 14/iridium layer 15.

An electrochemical cell was prepared as follows: Cathode flow field 10 contacts carbon paper 12a and membrane comprising the polymerized EVIM-Br and PFSA 12c contacts PFSA layer 14. Iridium layer 15 contacts a porous titanium gas diffusion layer 16, which is in contact with anode flow field 18.

Figure 2:
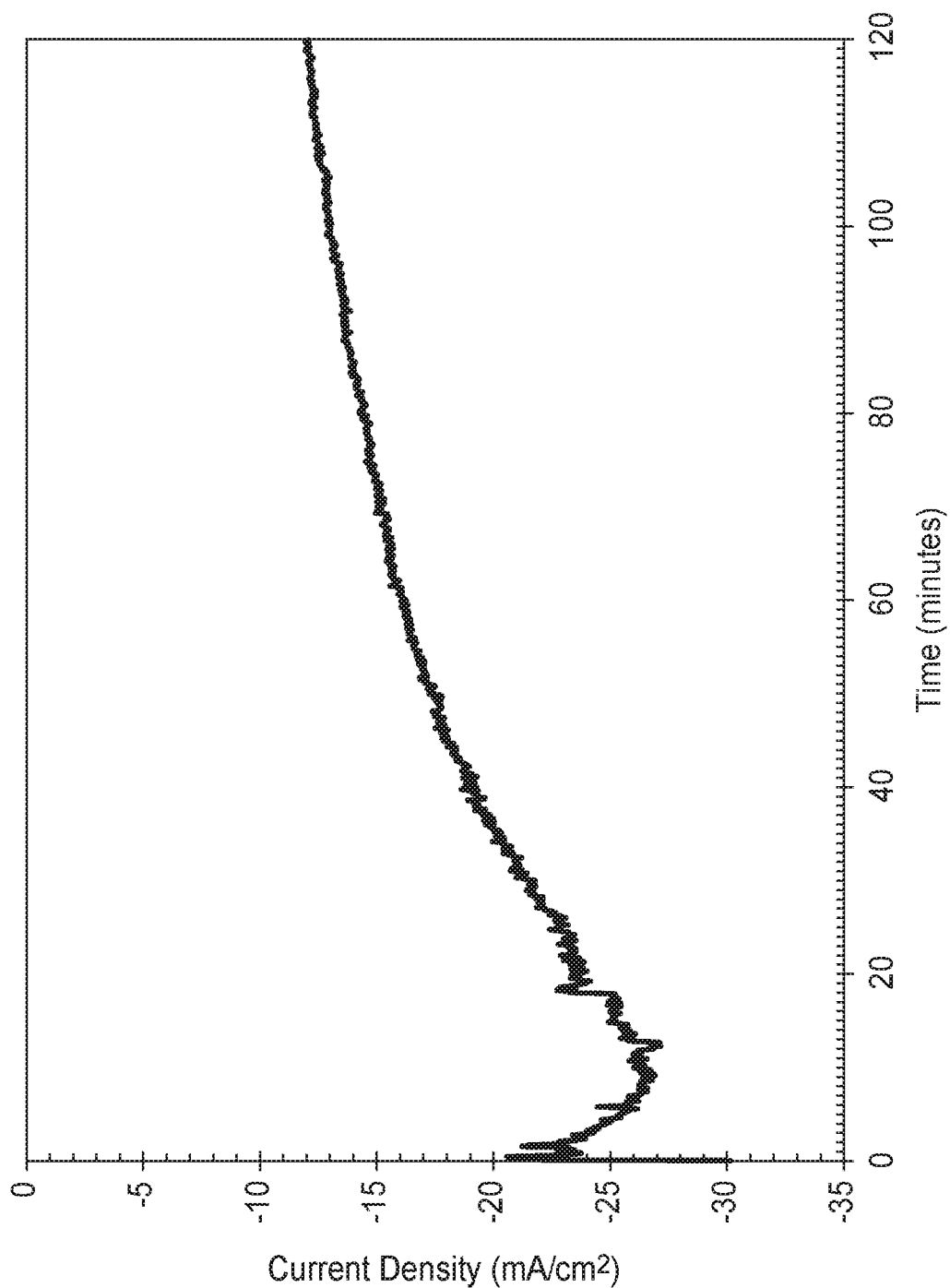
FIG. 2 is a plot of the current density vs. time for the carbon dioxide electrolyzer of Example 1.

The electrochemical cell as assembled was compressed to form the final assembled device using tempered bolts. A one cell 25 cm$^2$ test cell (Fuel Cell Technologies Inc., Albuquerque, N. Mex. wherein the graphite flow field from the anode side was removed and replaced with a titanium flow field) provided the combined current collectors and fluid/gas transport chambers. Carbon dioxide, not humidified, was fed into the cathode flow field of the electrochemical cell. The assembly was tested by connecting the appropriate liquid and gas channels and then performing a series of electrochemical experiments using a potentiostat (PAR 263a potentiostat, Advanced Measurement Technology Inc., Oak Ridge, Tenn.). The potentiostat was operated in constant potential mode with a full cell voltage (measured as the potential difference between the cathode and anode electrodes) of 3.1 V for 120 minutes. The current density versus time is shown in FIG. 2.

The output gas stream was analyzed for carbon monoxide (CO), hydrogen (H$_2$), and carbon dioxide (CO$_2$). The output gas stream from the cathode flow field of the electrolyzer was passed through a trap for collection of water in the gas stream before introduction into an Agilent 7890B gas chromatograph (Agilent Technologies, Santa Clara, Calif.). The % selectivity for CO is calculated as mole % of CO/(mole % CO+mole % H$_2$)

Figure 3:
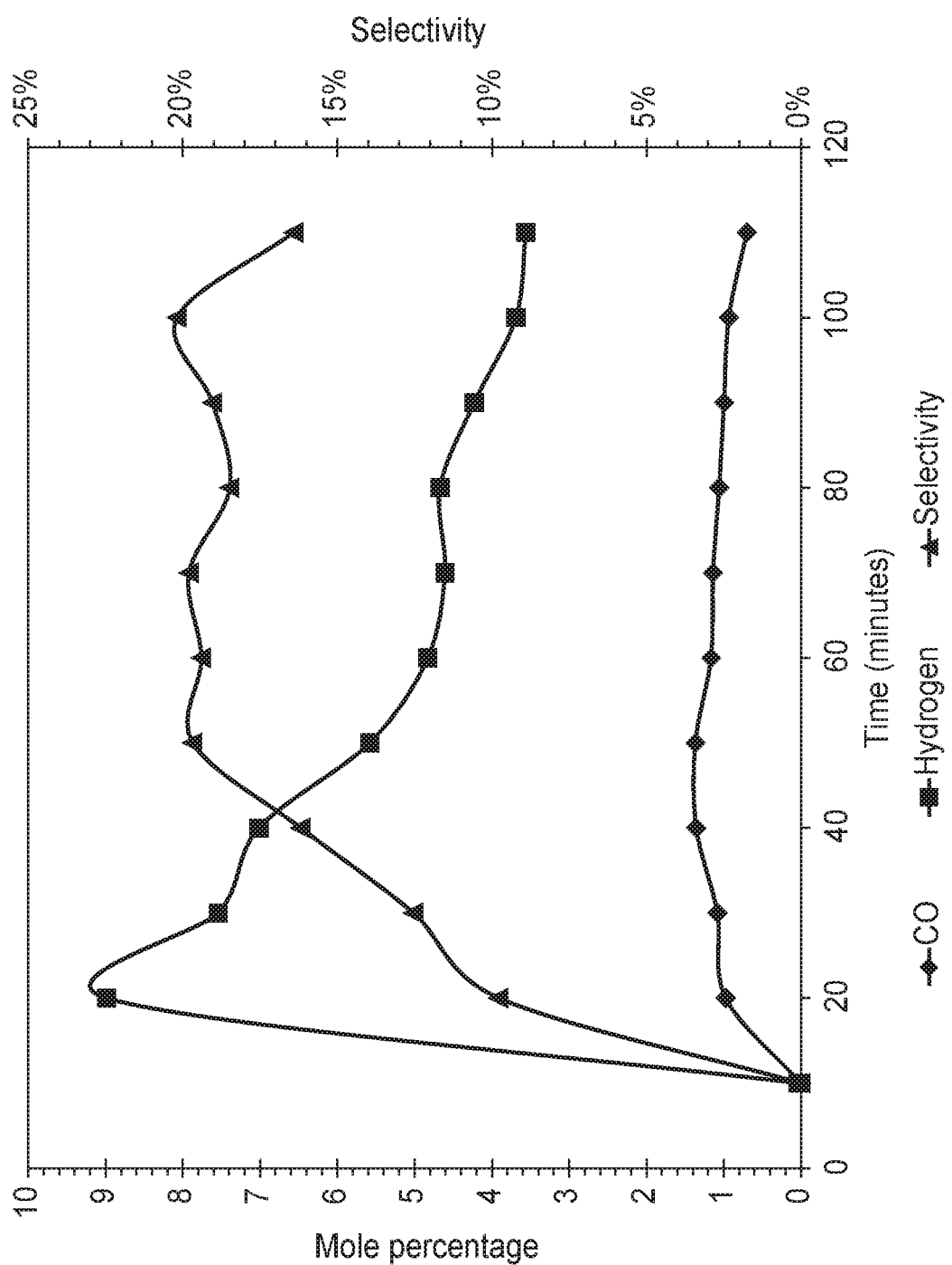
FIG. 3 is a plot of the gas chromatography measurements of the output gas stream of the carbon dioxide electrolyzer of Example 1.

The results are shown in FIG. 3. The predominant product was H$_2$ gas from electrolysis of water, although up to 20% of the product was carbon monoxide. The remainder of the output was unreacted CO$_2$. The assembly showed stable production of CO after the 40 minute mark at around 18-20% selectivity.

Comparative Example 1

The following components were used in the electrochemical cell.

Cathode: Cathode Membrane Assembly B

Anode: The anode membrane assembly was fabricated by depositing ruthenium onto a carbon paper gas diffusion layer (H2315 from Freudenberg FCCT SE & Co. KG, Weinheim, Germany) to a specific loading of 3.5 mg/cm$^2$ via sputter deposition.

Ion exchange membrane: The ion exchange membrane was prepared as follows: a solution consisting of 40% solids of PFSA polymer dispersion (825 equivalent weight, available from 3M Co.) was mixed with a stoichiometric amount (1:1 molar ratio) of 1,3-ethylmethylimidazolium chloride (BASF, Ludwigshafen, Germany) in a glass vial. The mixture was sonicated to remove air bubbles, cast onto a release liner to a thickness of 25 μm (7 mil), and then dried in an oven rated for solvents. Once dried, the resulting membrane was removed from the release liner.

The membrane electrode assembly was assembled and tested as described in Example 1. Briefly, the silver layer of the cathode membrane assembly was in contact with the ion exchange membrane, which was in contact with the ruthenium layer of the anode membrane assembly. The potentiostat was operated in constant potential mode with a full cell voltage (measured as the potential difference between the cathode and anode electrodes) of 3.1 V for 24 hours. The only detectable product was H$_2$ gas from electrolysis of water, as no signal for carbon monoxide was detected. The remainder of the output was unreacted CO$_2$. It was observed that the ionic liquid blended within the membrane had leeched out of the device during operation and collected in a trap designed to capture any liquid products from entering the GC.

Example 2

A membrane electrode assembly was constructed as described in Example 1 with the following exceptions:

Cathode Membrane Assembly C was used in place of Cathode Membrane Assembly A. The anode membrane assembly comprising the PFSA layer and an iridium layer was replaced by Membrane Z described below.

Membrane Z is a non-woven 7 mil (0.178 mm) nylon-6,6 substrate having a 0.8 micrometer pore size (nominal pore diameter), the substrate being covalently linked with the guanidinium quaternary amine cationic functional groups of the sulfate salt of agmatine (AGM, 1-(4-Aminobutyl)guanidine)) monomers. The membrane was prepared via a UV-initiated polymerization as described in Example 100 of patent application U.S. Pat. Publ. No. 2012-0252091 (Rasmussen et al.), with the exception that the primer monomer used to prepare the graft site was vinyldimethylazlactone (VDM) as described in Example 74 of the same patent application. The membrane, which originally contained sulfate counterions, was soaked in 1M KOH for 24 hr to exchange the sulfates for hydroxides and then rinsed with de-ionized water to form Membrane Z.

Figure 4:
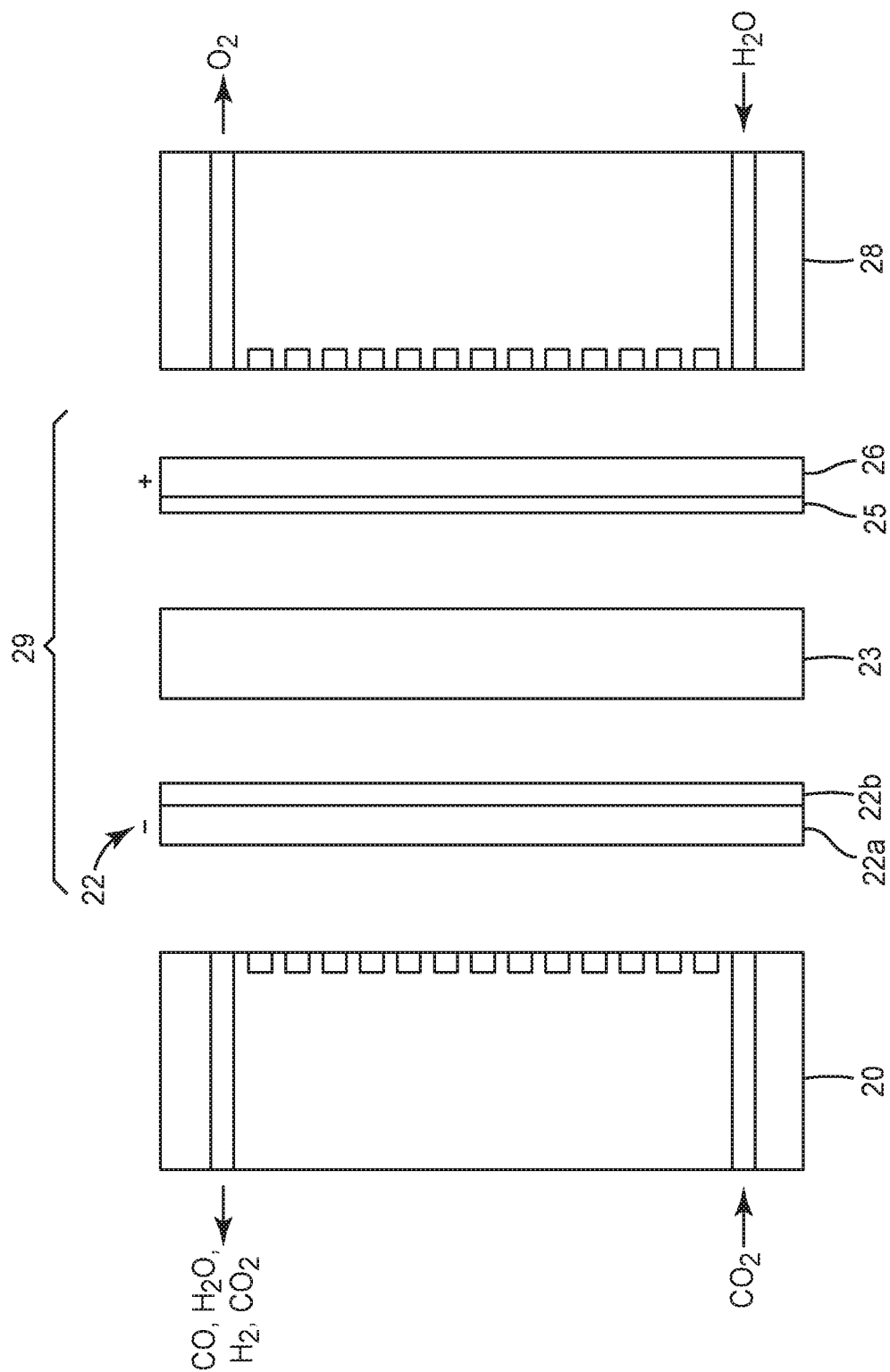
FIG. 4 is a cross-sectional schematic of the electrochemical cell of Example 2.

A membrane electrode assembly was prepared as follows with reference to FIG. 4: Cathode flow field 20 contacts carbon paper 22a and silver layer 22b of Cathode Membrane Assembly C contacts Membrane Z 23, which contacts ruthenium layer that contacts a porous titanium gas diffusion layer 26, which contacts anode flow field 28.

Figure 5:
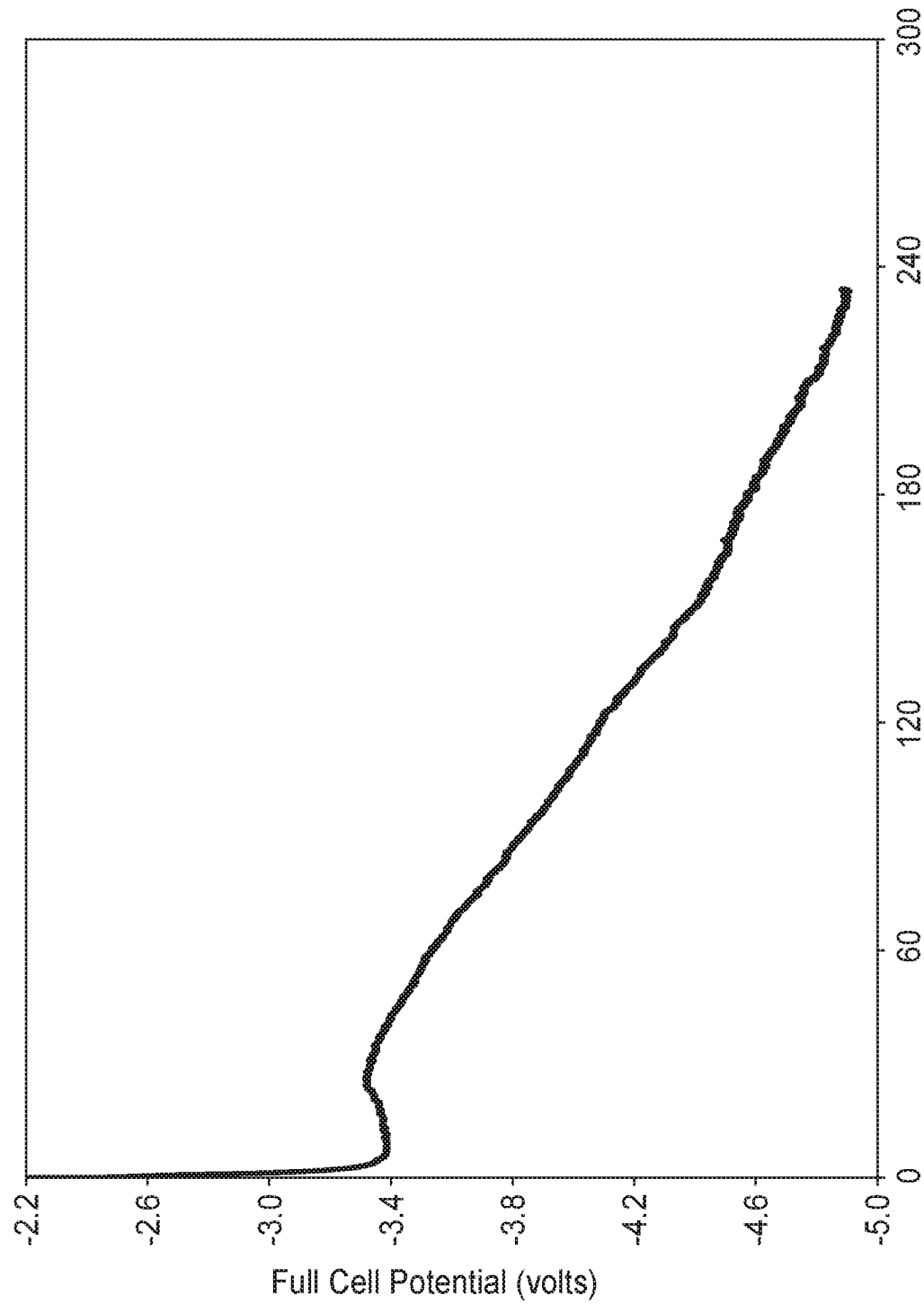
FIG. 5 is a plot of voltage vs. time for the carbon dioxide electrolyzer of Example 2.

The membrane electrode assembly as assembled and tested as described in Example 1, with the cell operated in constant current mode with a current density of 1 mA/cm$^2$ for 240 minutes. The full cell voltage vs. time plot is shown in FIG. 5. After reaching an initial voltage of 3.4 V over the first 20 minutes, the voltage started to increase monotonically until it exceeded 5 V near the 240 minute mark, at which point the experiment terminated due to the operating window set within the software.

Figure 6:
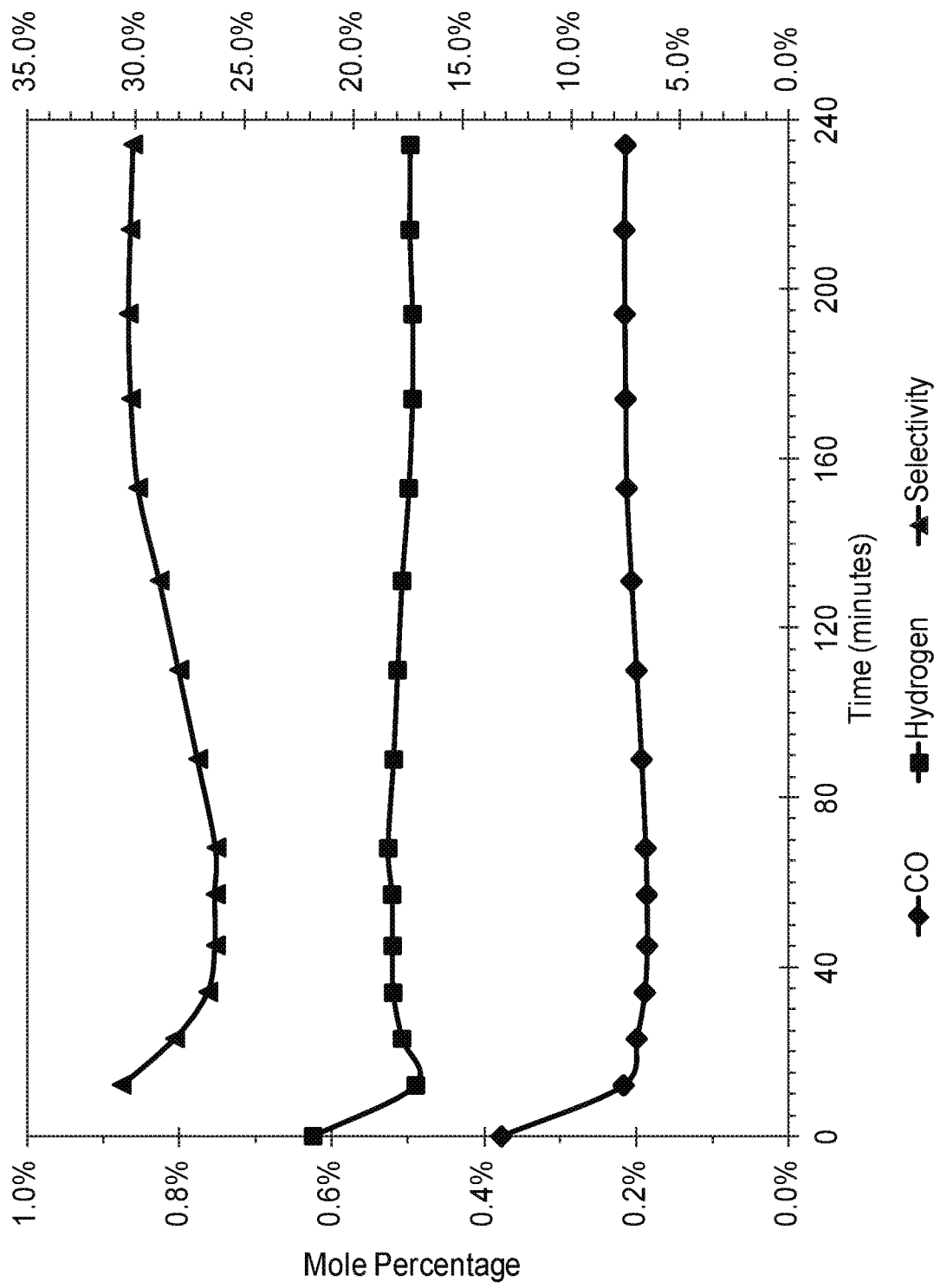
FIG. 6 is a plot of the gas chromatography data for the carbon dioxide electrolyzer of Example 2.

The results from the output gas stream are shown in FIG. 6. The predominant product was $H_2$ gas, although up to 30% of the product was carbon monoxide. The device showed exceptionally stable production of CO up to the 240 minute mark at around 30% selectivity.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A cathode membrane assembly for an electrolyzer, comprising a porous, electrically conductive substrate, at least one catalytically active element in electrical contact with the electrically conductive substrate, and an anion exchange polymer in contact with the at least one catalytically active element wherein the anion exchange polymer comprises at least one positively charged group selected from a guanidinium, a guanidinium analog, an N-alkyl conjugated heterocyclic cation, or combinations thereof.

2. The cathode membrane assembly of claim 1, wherein the N-alkyl conjugated heterocyclic cation is selected from N,N'-disubstituted imidazoliums, 1,2,3-tri substituted imidazoliums, N-substituted pyridiniums, N-substituted isoquinoliniums, N-disubstituted pyrrolidiniums, or combinations thereof.

3. The cathode membrane assembly of claim 1, wherein the anion exchange polymer is the reaction product of at least an alkyl-substituted vinyl imidazolium monomer.

4. The cathode membrane assembly of claim 1, wherein the anion exchange polymer forms a polymeric anion exchange membrane layer that is porous.

5. The cathode membrane assembly of claim 1, wherein the anion exchange polymer forms a polymeric anion exchange membrane layer that is dense.

6. The cathode membrane assembly of claim 1, wherein the at least one catalytically active element is selected from V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, Nd, and alloys or combinations thereof.

7. The cathode membrane assembly of claim 6, wherein the at least one catalytically active element is selected from silver, gold, copper, or combinations thereof.

8. The cathode membrane assembly of claim 1, wherein the porous, electrically conductive substrate comprises at least one of a carbon paper, carbon cloth, or a metal mesh.

9. A system for electrochemically reducing carbon dioxide comprising:
(a) an electrochemical device comprising (i) an anode electrode, (ii) the cathode membrane assembly of claim 1 adjacent the anode electrode, and (iii) a cathode flow field adjacent to the cathode membrane assembly opposing the anode electrode; and
(b) a carbon dioxide input, wherein the carbon dioxide input is configured to provide a composition comprising carbon dioxide to the cathode flow field for reduction of the carbon dioxide at the cathode electrode; and
(c) an external energy source, wherein the negative terminal of the external energy source is connected to the cathode and the positive terminal of the external energy source is connected to the anode.

10. The system of claim 9, further comprising a polymeric cation exchange membrane between the cathode membrane assembly and the anode electrode.

11. The system of claim 9, wherein the cathode membrane assembly is substantially free of a liquid electrolyte.

12. The system of claim 9, wherein the electrochemical cell is substantially free of a liquid electrolyte.

13. The system of claim 9, further comprising a catalytically active extended surface area catalyst-based electrode such as a nanostructured thin film electrode, a coated nanotube electrode, a porous sponge electrode, or a two dimensional polycrystalline film electrode.

14. A process for the electrochemical reduction of carbon dioxide comprising:
providing the system of claim 9;
introducing a composition comprising carbon dioxide to the cathode membrane assembly; and
applying electrical energy to the electrochemical device to effect electrochemical reduction of the carbon dioxide.

15. The process of claim 14, wherein the cathode membrane assembly is substantially free of a liquid electrolyte.

16. The process of claim 14, wherein water is introduced to the anode electrode as a reactant.

17. The process of claim 14, wherein the cathode membrane assembly is operated at a potential equal to or more negative than −0.2 V with respect to a standard hydrogen electrode.

18. The process of claim 14, wherein the process has a carbon monoxide selectivity of greater than 2%.

19. A process for producing hydrogen from water, comprising:
a. providing the system of claim 9;
b. introducing a composition comprising water to the anode electrode; and
c. applying electrical energy to the electrochemical device to effect electrochemical splitting of water.

20. An electrolyzer, comprising:
a cathode membrane, wherein the cathode membrane comprises a porous, electrically conductive substrate, at least one catalytically active element in electrical contact with the electrically conductive substrate, and an anion exchange polymer in contact with the at least one catalytically active element, and an anode, wherein the potential of the cathode membrane's catalytically active element in electrical contact with the electrically conductive substrate is more negative than the anode.

\* \* \* \* \*

UNITED STATES PATENT AND TRADEMARK OFFICE
CERTIFICATE OF CORRECTION

PATENT NO. : 11,118,274 B2
APPLICATION NO. : 16/741038
DATED : September 14, 2021
INVENTOR(S) : Tyler Matthews et al.

Page 1 of 1

It is certified that error appears in the above-identified patent and that said Letters Patent is hereby corrected as shown below:

In the Claims

<u>Column 15</u>
Line 43, In Claim 1, insert -- , -- before "wherein".
Line 49, In Claim 2, delete "1,2,3-tri substituted" and insert -- 1,2,3-trisubstituted --, therefor.

Signed and Sealed this
Tenth Day of May, 2022

Katherine Kelly Vidal
*Director of the United States Patent and Trademark Office*